United States Patent
Blue et al.

(10) Patent No.: US 12,247,937 B2
(45) Date of Patent: Mar. 11, 2025

(54) OPTICAL FIBER-BASED GAMMA CALORIMETER (OFBGC)

(71) Applicants: Ohio State Innovation Foundation, Columbus, OH (US); UT-Battelle, LLC, Oak Ridge, TN (US)

(72) Inventors: Thomas E. Blue, Columbus, OH (US); Anthony Birri, Columbus, OH (US); Christian M. Petrie, Knoxville, TN (US)

(73) Assignees: Ohio State Innovation Foundation, Columbus, OH (US); UT-Battelle, LLC, Oak Ridge, TN (US)

( * ) Notice: Subject to any disclaimer, the term of this patent is extended or adjusted under 35 U.S.C. 154(b) by 997 days.

(21) Appl. No.: 17/213,432

(22) Filed: Mar. 26, 2021

(65) Prior Publication Data

US 2021/0372957 A1    Dec. 2, 2021

Related U.S. Application Data

(60) Provisional application No. 63/031,093, filed on May 28, 2020.

(51) Int. Cl.
*G01K 17/00* (2006.01)
*G01N 25/48* (2006.01)
(Continued)

(52) U.S. Cl.
CPC ......... *G01N 25/4813* (2013.01); *G01K 17/00* (2013.01); *G01T 1/006* (2013.01); *G01T 1/12* (2013.01); *G21C 17/112* (2013.01)

(58) Field of Classification Search
CPC .... G01K 11/30; G01K 11/32; G01K 11/3206; G01K 17/00; G01N 25/4813; G01T 1/006; G01T 1/12; G21C 17/112
(Continued)

(56) References Cited

U.S. PATENT DOCUMENTS 4,298,430 A * 11/1981 Rolstad ................ G21C 17/102
                                                        376/254
4,393,025 A *  7/1983 Leyse ..................... G01T 1/12
                                                        976/DIG. 239
(Continued)

FOREIGN PATENT DOCUMENTS

AU   2015202034 A1 * 11/2015 ............. C01B 33/10
BE       861565 A  *  3/1978 ........... G21C 17/102
(Continued)

OTHER PUBLICATIONS

U.S. Appl. No. 17/213,432, filed Jan. 3, 2024_JP_H0843535_A_H.pdf, Feb. 16, 1996.*
(Continued)

*Primary Examiner* — Gail Kaplan Verbitsky
(74) *Attorney, Agent, or Firm* — Meunier Carlin & Curfman LLC

(57) ABSTRACT

An optical fiber-based gamma-ray calorimeter (OFBGC) sensor array which uses a thermal mass with a low thermal conductivity is provided. Advantages of the OFBGC sensor array include: 1) the number of sensors in the OFBGC sensor array is adjustable and limited only by the spatial resolution of the OFBGC sensors, within the OFBGC sensor array, and 2) the OFBGC sensor design is simpler to build than a conventional optical fiber-based gamma thermometer (OFBGT) sensor array. One purpose of the OFBGC is to determine the power distribution in nuclear reactors.

19 Claims, 8 Drawing Sheets

(51) Int. Cl.
  *G01T 1/00* (2006.01)
  *G01T 1/12* (2006.01)
  *G21C 17/112* (2006.01)
(58) Field of Classification Search
  USPC .......................................... 422/51; 436/147
  See application file for complete search history.

(56) References Cited

U.S. PATENT DOCUMENTS

| | | | |
|---|---|---|---|
| 4,440,716 A | | 4/1984 | Smith |
| 4,729,627 A | * | 3/1988 | Saito ...................... G01K 11/32 |
| | | | 374/161 |
| 4,788,436 A | * | 11/1988 | Koechner ................. G02B 6/34 |
| | | | 250/361 R |
| 5,015,434 A | | 5/1991 | Wimpee et al. |
| 6,477,219 B2 | | 11/2002 | Hirukawa et al. |
| 8,503,599 B2 | * | 8/2013 | Koste ................... G21C 17/112 |
| | | | 376/244 |
| 2010/0104080 A1 | * | 4/2010 | Appelman ............ H04L 51/224 |
| | | | 379/373.02 |
| 2015/0177107 A1 | * | 6/2015 | Song .................. G01K 11/3206 |
| | | | 374/161 |

FOREIGN PATENT DOCUMENTS

| | | | | |
|---|---|---|---|---|
| CN | 101573599 B | * | 1/2012 | ......... G01D 5/35364 |
| CN | 106052614 A | * | 10/2016 | ............. G01B 21/08 |
| CN | 113623548 A | * | 11/2021 | |
| DE | 4408273 A1 | * | 9/1994 | ........... G21C 17/112 |
| DE | 102015109493 A1 | * | 10/2016 | ............. G01B 21/08 |
| EP | 2182388 A2 | * | 5/2010 | ............. G01K 11/30 |
| JP | 03210442 A | * | 9/1991 | |
| JP | H 0179219 U | * | 2/1996 | |
| JP | H0843535 A | * | 2/1996 | |
| JP | 2007163208 A | * | 6/2007 | |

OTHER PUBLICATIONS

U.S. Appl. No. 17/213,432, filed Jan. 3, 2024_AU_2015202034_A1_H.pdf,Nov. 19, 2015.*
U.S. Appl. No. 17/213,432, filed Mar. 20, 2004_CN_101573599_A_H.pdf,Jan. 4, 2012.*
U.S. Appl. No. 17/213,432, filed Mar. 20, 2024_JP_H0179219_U_H.pdf,Feb. 16, 1996.*
U.S. Appl. No. 17/213,432, filed Mar. 20, 2024_DE_102015109493_A1_H.pdf,Oct. 13, 2016.*
U.S. Appl. No. 17/213,432, filed Mar. 19, 2024_JP_03210442_A_H.pdf,Sep. 13, 1991.*
U.S. Appl. No. 17/213,432, filed Mar. 20, 2024_CN_106052614_A_H.pdf,Oct. 26, 2016.*
U.S. Appl. No. 17/213,432, filed Jul. 15, 2024_JP_2007163208_A_H.pdf,Jun. 28, 2007.*
U.S. Appl. No. 17/213,432, filed Oct. 23, 2024_BE_861565_A_H.pdf,Mar. 31, 1978.*
U.S. Appl. No. 17/213,432, filed Oct. 23, 2024_JP_H0843535_A_H.pdf,Feb. 16, 1996.*
C.L. Martin, "Gamma Thermometer System for LPRM Calibration and Power Shape Monitoring," Licensing Topical Report, GE Nuclear Energy, NEDO-33197, Revision 0, Sep. 2005.
W. Bernnat, K. Siegel, U. Wolff, "Sensitivity of Gamma Thermometer for Local Power Monitoring in Light Water Reactors", pp. 294-301.
G. Apelqvist, T. Andersson, L. Magnusson, "Radcal Gamma Thermometers-Performance Experience from Swedish Light Water Reactors," Proceedings of NEA Specialists' Meeting on In-core Instrumentation and Reactor Assessment, pp. 262-270, Cadarache, France, 1988.
H. Devold, "Irradiation Performance of Gamma Thermometers Relative to Neutron Detectors," pp. 111-125. 1988.
F. Loisy, M. Huver, M. Janvier, "Technology and Use of Gamma Thermometers," NEA Specialists' Meeting on In-core Instrumentation and Reactor Assessment, pp. 271-277, Cadarache, France, 1988.
D. Janvier, M. Sauret, "Fixed Incore Instrumentation Radcal Gamma Thermometer Performance Experienced at EDF Reactors," pp. 285-293.
K. Romslo, Moen, "Radcal Gamma Thermometer: A Promising Device for Accurate Local Fuel Power Measurements in Light Water Reactors," pp. 99-107.
Birri, Anthony, and Thomas E. Blue. "Methodology for inferring reactor core power distribution from an optical fiber based gamma thermometer array." Progress in Nuclear Energy 130 (2020): 103552.
S. Girard et al, "Radiation Effects on Silica-Based Optical Fibers: Recent Advances and Future Challenges." IEEE Trans. on Nuc. Sci., vol. 60, No. 3, pp. 2015-2036, 2013.
P.F. Kashaykin et al, "Radiation-Induced Attenuation in Silica Optical Fibers Fabricated in High O2 Excess Conditions." IEEE J. Light. Tech., vol. 33, No. 9, pp. 1788-1793, 2015.
C.M. Petrie, A. Birri, T.E. Blue, "High-dose temperature-dependent neutron irradiation effects on the optical transmission and dimensional stability of amorphous fused silica." J. Non-Crys. Sol. vol. 525, 2019.
W. Primak, "Fast-neutron-induced changes in quartz and vitreous silica," Phys. Rev., vol. 110, pp. 1240, 1958.
L. Remy et al, "Compaction in Optical Fibres and Fibre Bragg Gratings Under Nuclear Reactor High Neutron and Gamma Fluence." IEEE Trans. Nuc. Sci., vol. 63, No. 4, pp. 2317-2322,2016.
Robert K. Palmer, Thomas E. Blue, "Modulation Transfer Function for Distributed Temperature Measurements Using an Optical Fiber Sensor System." IEEE Sensors, vol. 18, No. 5, pp. 1911-1918, 2018.
G. D. Boreman, "MTF in optical systems," in Modulation Transfer Function in Optical and Electro-Optical Systems. Bellingham, WA, USA: SPIE, 2001, pp. 1-30.
J. R. Lamarsh, Introduction to Nuclear Engineering, 2nd ed. Reading, MA, USA: Addison-Wesley Pub. Comp. Inc., 1983, ch. 6, sec. 3, pp. 230-231.
INL, 2009, Advanced Test Reactor National Scientific User Facility Users' Guide, INL/EXT-08-14709.
C.M. Petrie et al, "Experimental design and analysis for irradiation of SiC/SiC composite tubes under a prototypic high heat flux." J. Nucl. Mat., vol. 491, pp. 94-104, 2017.
A. Iino, M. Kuwabara and K. Kokura, Mechanisms of Hydrogen-Induced Losses in Silica-Based Optical Fibers, Journal of Lightwave Technology, 8, 1675 (1990).
F. P. Incropera, Fundamentals of Heat and Mass Transfer 6th ed., pp. 151, V. Vargas, Ed., John Wiley & Sons, (2007).
Birri, Anthony, Christian M. Petrie, and Thomas E. Blue. "Parametric Analysis of an Optical Fiber-Based Gamma Thermometer for University Research Reactors Using an Analytic Thermal Model." Nuclear Technology 207.12 (2021): 1865-1872.
Petrie, Christian M., and Joel L. McDuffee. "Liquid level sensing for harsh environment applications using distributed fiber optic temperature measurements." Sensors and Actuators A: Physical 282 (2018): 114-123.

* cited by examiner

400

450

500

550

700

OPTICAL FIBER-BASED GAMMA CALORIMETER (OFBGC)

CROSS-REFERENCE TO RELATED APPLICATIONS

This application claims the benefit of U.S. provisional patent application No. 63/031,093, filed on May 28, 2020, and entitled "AN OPTICAL FIBER-BASED GAMMA CALORIMETER WITH SIMPLE DESIGN AND POTENTIAL FOR ADJUSTABLE AXIAL SEGMENTATION," the disclosure of which is expressly incorporated herein by reference in its entirety.

STATEMENT OF GOVERNMENT SUPPORT

This invention was made with government support under Award Number DE-NE0008810 awarded by the U.S. Department of Energy (DOE). This invention was made with government support under Award Number DE-NE0000110 awarded by the U.S. Department of Energy (DOE). The government has certain rights in the invention.

BACKGROUND

The volumetric power distribution in boiling water reactors (BWRs) is monitored by local power range monitors (LPRMs). LPRMs contain a cathode, an anode, and an inert gas environment in the space in between. The cathode is coated with a fissionable material, and when thermal neutrons interact with the fissionable material, fission fragments from the interaction cause ionization within the inert gas. The result is an electric current between the anode and cathode which is monitored to determine the power. Over time, the LPRMs lose sensitivity due to burnup of the fissionable material, and they need recalibrated. Currently, LPRMs are calibrated with traversing in-core probes (TIPs). TIPs are principally similar to LPRMs, so they need to be inserted for calibration, and removed after calibration, to avoid burnup within the TIPs. There can be around 170 LPRMs which need calibration in a BWR, and the process to get a TIP next to each one of these LPRMs involves a complex process of passing the TIPs through numerous valves designed to prevent the release of radioactive material to the environment. Also, even with these valves in place, there is still the possibility of a release of radioactive material.

A way to prevent the release of radioactive materials out of the reactor vessel is to have a permanent system of sensors in place for LPRM calibration, with sensor responses, which are not affected by radiation. This would also make the calibration process significantly more efficient. Gamma thermometers (GTs) are not new technology. A more proper name for a gamma thermometer is "gamma-ray calorimeter," but the industry recognizes the sensor by the name gamma thermometer. They have been investigated, tested, and utilized in numerous applications within BWRs, pressurized water reactors (PWRs), and heavy-water boiling reactors (HBWRs).

An optical fiber-based gamma thermometer (OFBGT) is described in U.S. Pat. No. 8,053,599 to Koste et al. (the "'599 patent"). The '599 patent describes OFBGT sensors, where the sensors form a linear array of isolated and distinct sensors, which are formed using isolated and distinct metallic thermal masses that are distributed along the length of an optical fiber that is used for temperature sensing. An optical fiber is used to measure the temperatures in the isolated and distinct metallic thermal masses. The measurement is localized to the position of the thermal masses. However, the number of sensors is fixed, and the OFBGT is complex to build.

It is with respect to these and other considerations that the various aspects and embodiments of the present disclosure are presented.

SUMMARY

An optical fiber-based gamma-ray calorimeter (OFBGC) sensor array which uses a thermal mass with a low thermal conductivity is provided. Advantages of the OFBGC sensor array include: 1) the number of sensors in the OFBGC sensor array is adjustable and limited only by the spatial resolution of the OFBGC sensors, within the OFBGC sensor array, and 2) the OFBGC sensor design is simpler to build than a conventional optical fiber-based gamma thermometer (OFBGT) sensor array. One purpose of the OFBGC is to determine the power distribution in nuclear reactors.

In an implementation, an optical fiber-based gamma calorimeter (OFBGC) comprises: a thermal mass; an insulating tube disposed within a central region of the thermal mass; a plurality of optical fiber sensors running through respective holes in the insulating tube, wherein the optical fiber sensors are configured to monitor a temperature of the thermal mass; and an outer sheath; with a gas backfilling between the thermal mass and the outer sheath.

In an implementation, an optical fiber-based gamma-ray calorimeter (OFBGC) sensor array comprises an optical fiber, wherein the optical fiber is used to measure the temperature of an annular cylindrical thermal mass with a low thermal conductivity.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
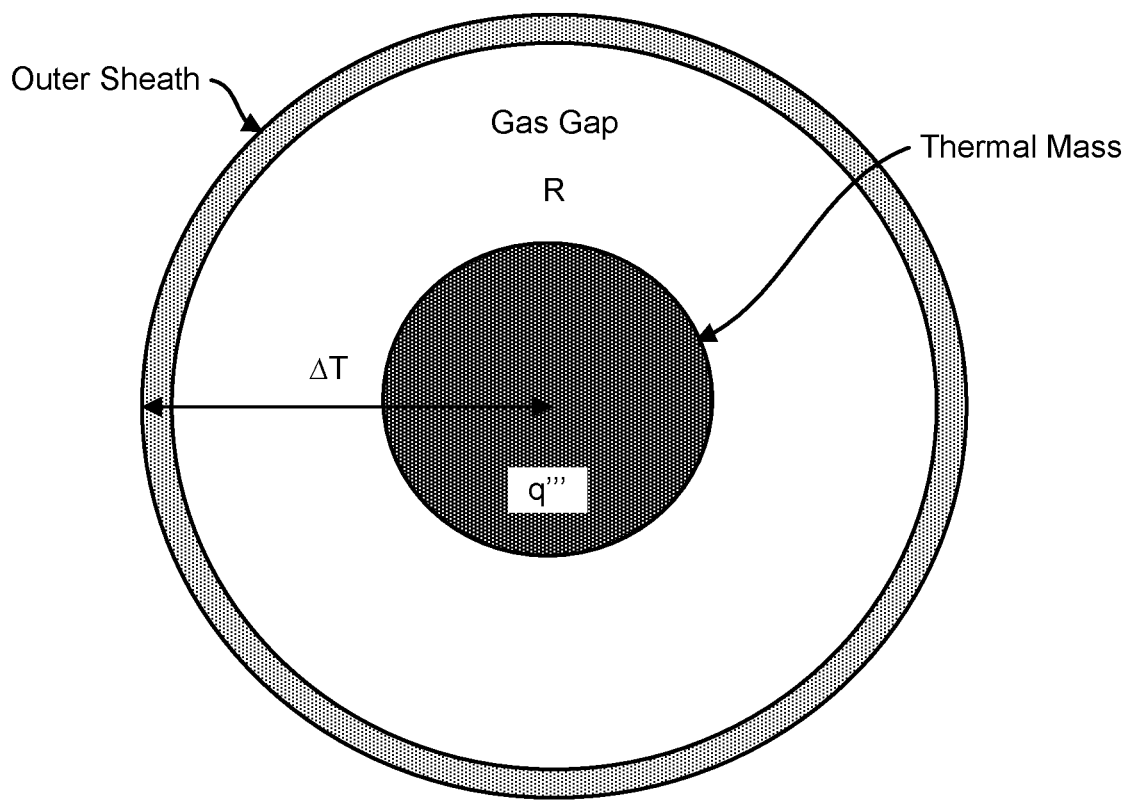
FIG. 1 illustrates a diagram of a top down view of an example OFBGC.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

An optical fiber-based gamma-ray calorimeter (OFBGC) sensor array is described herein. With respect to conventional devices and systems, the term gamma thermometer (GT) is used herein. With respect to the devices and systems described and contemplated herein with respect to embodiments and implementations in accordance with the present invention, the term gamma-ray calorimeter (GC) will be used e.g., with respect to the optical fiber based gamma-ray calorimeters (OFBGCs) described and contemplated herein.

Before explaining the details of the OFBGC, the basic principle of an example OFBGC is described. FIG. 1 illustrates a diagram of a top down view of an example OFBGC 100. An OFBGC comprises a thermal mass, an outer sheath, and a gap between the thermal mass and outer sheath. The material of the thermal mass is chosen to emphasize gamma heating in comparison to neutron heating. In the depiction of the OFBGC 100 in FIG. 1, the thermal mass is a solid cylinder, and the outer sheath is a cylindrical tube. The cylindrical geometry allows the OFBGC 100 to be placed in line with fuel elements in a reactor core, and to monitor the entire length of the reactor core. The gamma heating (as well as a small fraction of neutron heating) energy is deposited in the thermal mass. The energy deposition results in an axially dependent linear heating rate, $q'(z)$. The thermal mass, gas gap, and outer sheath have a combined axially dependent thermal resistance given by $R(z)$. The $q'(z)$ drives a temperature difference, $\Delta T(z)$ across the thermal resistance. One can write, in analogy with Ohm's law:

$$q'(z) = \frac{\Delta T(z)}{R(z)} \quad (1)$$

In the OFBGC 100 that is described above, it is assumed that the temperatures are measured using a pair of optical fibers and that $q'(z)$ is determined based on the measured $\Delta T(z)$ and a knowledge of $R(z)$.

Figure 2:
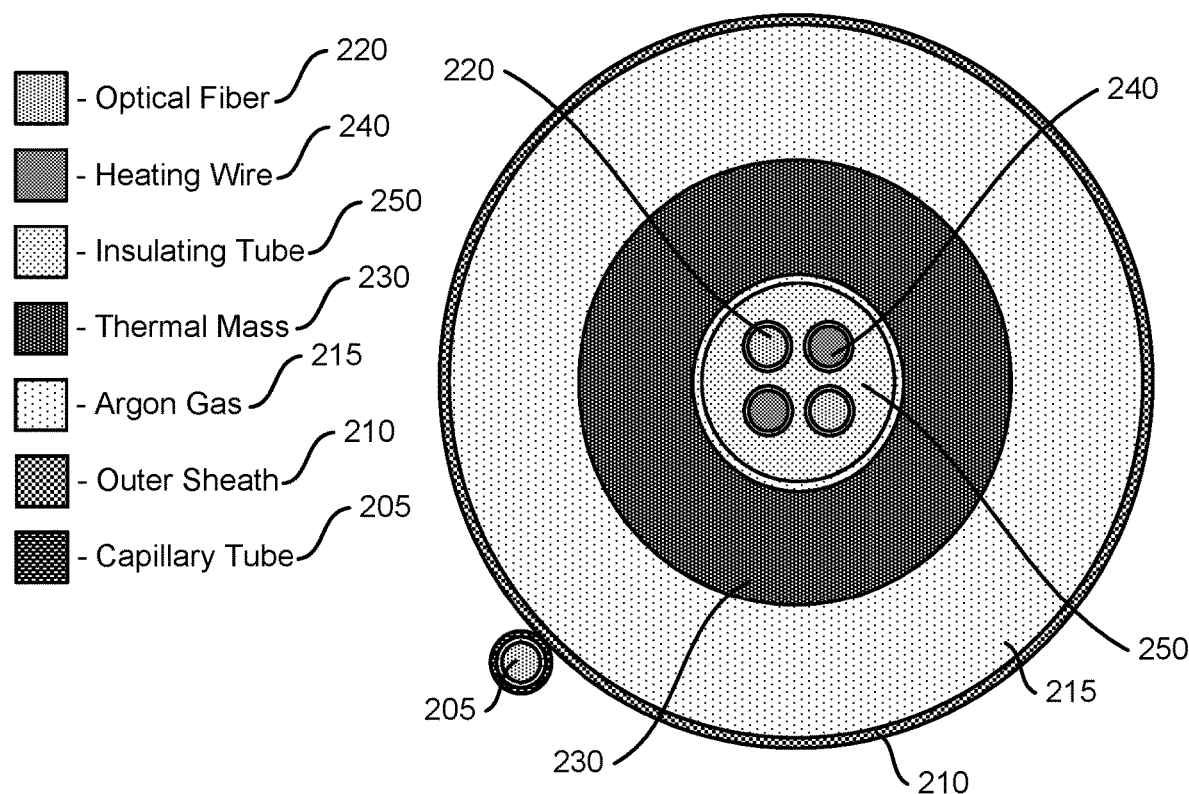
FIG. 2 illustrates a diagram of a top down view of an implementation of an OFBGC.

The pair of optical fibers are configured such that one optical fiber measures the axially distributed temperature in the thermal mass, and one optical fiber measures the axially distributed temperature of the outer sheath; $\Delta T(z)$ is the axially dependent difference in temperature between these fibers. A depiction (not drawn to scale) of an implementation of an OFBGC 200 is provided in FIG. 2. FIG. 2 illustrates a diagram of a top down view of an implementation of an OFBGC 200. In this case, the thermal mass 230 comprises multiple parts. There is a bulk component to the thermal mass 230, which is responsible for the most significant contribution to the gamma-ray heating. It is annular in shape. An insulating tube 250 is a 4-hole tube that is located within the central region of the annular thermal mass 230. The 4-hole tube is an electrical insulator. In an implementation, it is a thermocouple wire insulator.

Optical fiber 220 sensors run through two holes in the insulating tube 250. The two optical fibers 220 in the thermal mass 230 allow for redundancy in the measurement of $\Delta T(z)$. The intent is to interrogate the fibers 220 over their lengths using optical frequency domain reflectometry (OFDR) to measure the temperatures. A single heating wire 240, which is electrically connected to a power supply to complete an electrical circuit, runs down one of the remaining two holes in the repurposed thermocouple wire guide tube and returns to a power supply through the final hole. The purpose of the heating wire 240 is for calibration of the OFBGC 200. If one applies a known power to the heating wire 240, and the heating wire's length is known, then one can determine the $q'$ that is generated by the heating wire 240. By varying the joule heating of the wire 240, one can develop a relationship between $q'$ and $\Delta T$. Then, when the OFBGC 200 is heated by gamma rays and neutrons only (i.e., with the power supply off), the measured $\Delta T(z)$ can be related to a corresponding gamma-ray induced $q'(z)$ (and hence gamma-ray dose rate), using the previously determined calibration.

The OFBGC 200 is backfilled by a gas with known thermal properties, such as argon gas 215. Inert gases, such as argon, work well for this purpose. The main gap, due to its size and the low thermal conductivity of its fill gas (the argon gas 215), comprises the dominant thermal resistance in comparison to the thermal resistance of the solid parts of the OFBGC 200, thereby making the temperature relatively constant from the center of the thermal mass 230, to its edge. The outer sheath 210 temperature is monitored by an additional optical fiber, within a capillary tube 205, tack welded or otherwise connected onto the outer sheath. This allows for the accurate determination of $\Delta T(z)$.

When the OFBGC 200 is placed within a reactor core, its thermal mass 230 will receive a distributed volumetric energy deposition rate, $q'''(z)$, which may vary in the axial direction, due to the axial dependence of the power distribution within the reactor. The distribution in energy deposition will result in an axially dependent radial heat flux from the surface of the thermal mass $q''(r,z)$. The axial distribution of the heat flux from the surface of the thermal mass $q''(r,z)$ will not exactly match the volumetric energy deposition profile, $q'''(z)$ in the OFBGC 200, as a consequence of diffusion of thermal energy, in the axial direction in the thermal mass 230. Moreover, thermal energy will diffuse in the gas gap and in the OFBGC's metallic sheath. In summary, diffusion of thermal energy in the radial direction will be somewhat modulated by the diffusion of thermal energy in the axial direction in the thermal mass, the gas gap, and in the metallic sheath.

When the OFBGC is calibrated, the energy deposition rate will negligibly vary in the axial direction, and therefore temperature modulation due to axial diffusion of thermal energy will not be taken into account in the calibration. This will lead to an inherent error in in-situ measurements with the OFBGC, if the effects of thermal diffusion in the axial direction are significant. Consequently, implementations of the OFBGC may be designed with dimensions and materials such that this modulation is negligible.

The degree to which the measurement of $q'(z)$ is modulated by the axial diffusion of thermal energy is characterized for the OFBGC. One can characterize the extent to which the measurement of $q'(z)$ is modulated using a modulation transfer function, or MTF. It has been determined that the MTF for the optical fiber based thermal sensor is analogous to the MTF for a one-dimensional linear optical system. For a one-dimensional linear optical system that is imaging an object with spatial frequency (k), the MTF (M(k)) is the magnitude of the optical transfer function (OTF). The OTF is a function of k; i.e., OTF=OTF(k). The OTF is the ratio of the complex output of the imaging system for an object with spatial frequency k to the complex input to the imaging system for the same object. It is written in terms of its real and complex parts as $$OTF(k) = M(k) e_{-i\Theta(k)} \quad (2)$$

where M(k) is its real part and $\Theta$(k) (the phase transfer function) is its complex part. The phase transfer function (PTF) corresponds to a translation of the image of the object relative to the position of the object itself. The analog of the PTF was assumed to be equal to zero for the optical fiber based thermal sensor. Similarly, the analog of the PTF is assumed to be zero for the OFBGC that is analyzed herein. Returning to the discussion of M(k), the contrast of an image is degraded for values of M(k) that are less than 1. Generally, as k increases, M(k) decreases, and the optical contrast decreases, which means that, at some point, an object with too high of a spatial frequency will be blurred beyond resolvability.

For the case of the OFBGC, one can calculate a thermal MTF that is analogous to the optical MTF. For the OFBGC, the MTF has dimensions. In this case, the MTF is the ratio of $\Delta T(z)$ (the numerator), from the optical fibers within the thermal mass of the OFBGC to the optical fiber that is within a microcapillary tube that is tack welded to the outside of the outer sheath of the OFGBC; to q'''(z) (the denominator); assuming that q'''(z) varies sinusoidally with axial position z with spatial frequency k.

$$MTF(k) = \left( \frac{\Delta T(z)}{q'''(z)} \right)\bigg|_k \quad (3)$$

The MTF for the OFGBC characterizes the extent to which the output, $\Delta T$, is modulated by the thermal mass, the gas gap (which holds the gas backfill), and the outer sheath, due to the diffusion of thermal energy in these materials. In analogy with the one dimensional optical imaging system, g''' is the "object," and $\Delta T$ is the "image." By determining the thermal MTF associated with the OFBGC, one can determine: 1) the expected calibration error for the particular sinusoidal distribution in q'''(z) that is associated with a given average core power distribution and 2) the limits of resolution for high spatial frequency deviations in q'''(z) from the overall lower spatial frequency of the average core power distribution.

Thus, to reiterate, an OFBGC is composed of an isolated thermal mass, an outer sheath, and a sufficient gap between the thermal mass and the sheath. The OFBGC temperature (the temperature of the thermal mass) is monitored with an optical fiber, and a second optical fiber monitors the temperature of the outer sheath. A temperature difference, $\Delta T$, is generated between the thermal mass and outer sheath, as a result of the heating resistance of the gap. Assuming that the relationship between energy deposition and $\Delta T$ is known, one can acquire a dose rate measurement in the OFBGC. The dose rate measurement in a given OFBGC can be used to calibrate an adjacent LPRM, assuming the relationship between dose rate and power is known for the given core configuration. Note that the OFBGCs themselves would not be ideal for direct power monitoring, because they do not measure thermal neutron flux (which is directly proportional to power), and a OFBGC may not capture transients due to the time constant associated with the thermal mass heating.

A system of OFBGCs for LPRM calibration is improved over thermocouple-based GTs, because they use optical fiber-based temperature sensing. Utilizing optical frequency domain reflectometry (OFDR), one can acquire a distributed temperature measurement along an optical fiber; thus, one can monitor the temperature of multiple OFBGCs with the same fiber. In addition, when the OFBGC is designed to extend the length of an instrument tube of a reactor, it can acquire multiple data points along the length of the instrument tube; one would need multiple conventional thermocouple-based GTs to achieve this, and such a string of GTs would involve an excess of cabling and never compare with the sub-cm resolution capability of OFDR-based temperature measurement with the OFBGC. Also, due to the extremely small diameter of an optical fiber (~100 μm), an OFBGC can be made smaller than a conventional thermocouple-based GT.

Figure 3:
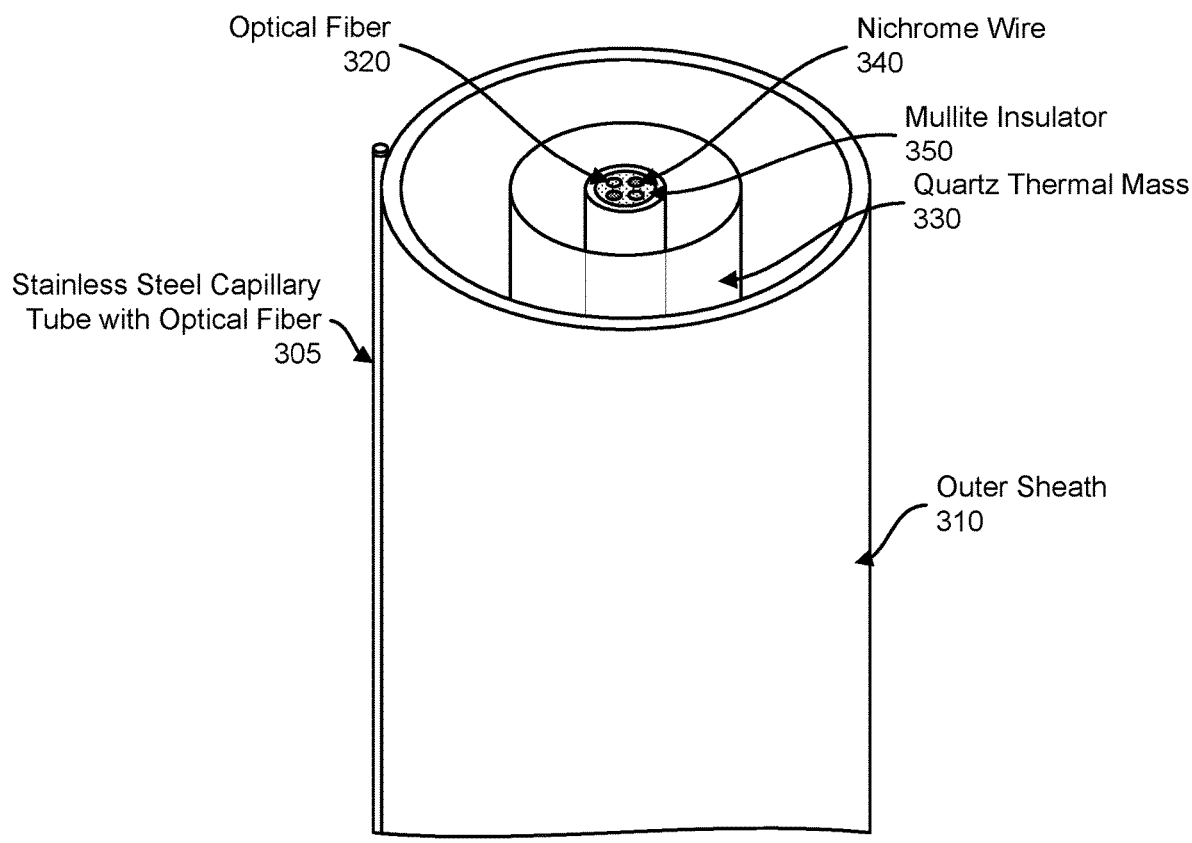
FIG. 3 illustrates a diagram of a perspective view of another implementation of an OFBGC.

FIG. 3 illustrates a diagram of a perspective view of another implementation of an OFBGC 300. The OFBGC comprises three main parts: the thermal mass 330, the gas gap, and the outer sheath 310. The thermal mass 330 is responsible for the linear heating rate, which is referred to as q'(z). The gas gap has the dominant thermal resistance out of the three OFBGC regions. The combined resistance of the three regions is referred to as R(z). A temperature difference, $\Delta T(z)$, is generated across the gas gap between the thermal mass 330 and the outer sheath 310, as described by $$\Delta T(z) = q'(z) R(z) \quad (4)$$

The bulk of the thermal mass 330 is a thick quartz glass tube, which is chosen because of its low thermal conductivity. Within the quartz tube is a mullite insulating tube (mullite insulator 350) with four through-holes. Mullite is also a low thermal conductivity material. Within two of the through holes are two optical fibers 320, for redundancy. Within the other two through holes is a nichrome heating wire, referred to as nichrome wire 340, which travels down the thermal mass 330 and back up the thermal mass 330. The nichrome wire 340 is used to calibrate the OFBGC 300, by supplying a known range of energy deposition rates, thus developing a relationship between $\Delta T$ and, effectively, $q_\gamma$. Between the mullite insulator 350 and the quartz glass tube is silica powder, which helps to equilibrate the temperature in the transverse plane of the thermal mass.

The gas gap is composed of argon. Due to its inertness, argon is advantageous with respect to the longevity of the sensor. If air were used in the gap, the optical fiber 320 could be subjected to hydrogen which can diffuse into the fiber 320, impacting the optical properties of the fiber 320. Also, argon is a more predictable gas than air with regards to thermal performance. Argon is relatively cheap, compared to other inert gases. Argon is more ideal than helium, because helium has such a relatively high thermal conductivity, that the $\Delta T$ generated across the gap will be too low.

In some implementations, the outer sheath 310 is constructed of aluminum 5052, which is an inexpensive, corrosion resistant material. Aluminum 5052 has a very high thermal conductivity, which allows for the temperature difference across the outer sheath itself to be negligible, even though gamma-ray energy is deposited in the outer sheath. Aluminum alloy is more optimal than stainless steel for implementation of an OFBGC in a low power university research reactor, because it will not be as much of a radioactivity concern after experimentation in a reactor. The temperature of the outer sheath 310 is monitored by an optical fiber within a stainless steel capillary tube 305 tack welded to the outer sheath 310. Aluminum would be a better material for the capillary tube 305 from a radiological standpoint, but the capillary tube dimensions limit the material choice to stainless steel.

In an implementation for a university research reactor, the overall dimensions of each of the parts described with respect to FIG. 3 are summarized in TABLE 1.

TABLE 1

Dimensions of an implementation of an OFBGC Design for a university research reactor

| Part Name | Inner Diameter (mm) | Outer Diameter (mm) |
|---|---|---|
| Optical Fiber 320 | n/a | 0.24 |
| Nichrome Wire 340 | n/a | 0.32 |
| Mullite Insulator 350 | 1.59 | 0.40 |
| Quartz Thermal Mass 330 | 2 | 6 |
| Outer Sheath 310 | 11.7 | 12.7 |
| Capillary Tube 305 | 0.37 | 0.48 |

Figure 4A:
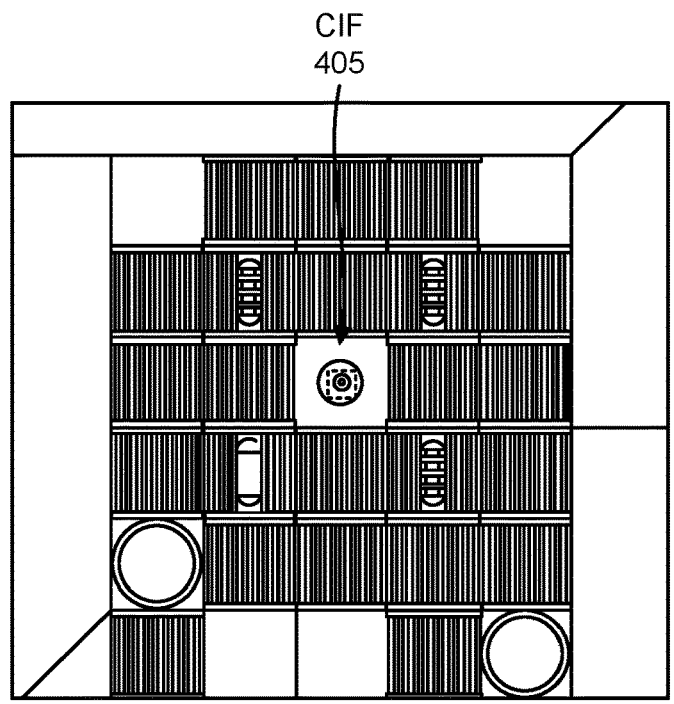
FIGS. 4A and 4B illustrate visual representations of an implementation of an OFBGC.
Figure 4B:
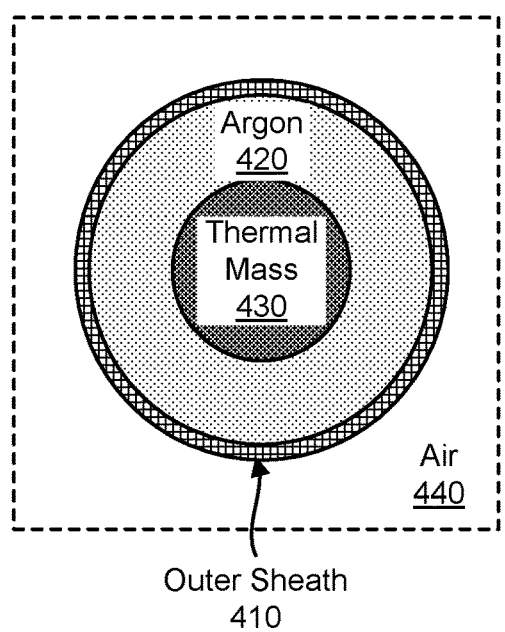

Monte Carlo N-Particle Transport (MCNP) modeling is now described. MCNP is a well-known software application often used for modeling and characterization. For the MCNP modeling of an example OFBGC, consider an implementation of a simplified OFBGC design representation. Consider an OFBGC with three regions: a quartz thermal mass, an argon gas gap, and an aluminum outer sheath. In this simplified model, do not consider the eccentricities within the thermal mass, which are the insulator, fibers, nichrome wire, etc. The OFBGC is placed within a tube of a reactor in an MCNP model. In the example, the reactor core is 24 inches in core height, and the OFBGC is 36 inches long. The OFBGC is placed in a MCNP model such that the bottom of the OFBGC is in contact with the core bottom, and the top of the OFBGC extends 12 inches above the reactor core. FIGS. 4A and 4B illustrate visual representations 400, 450 of an implementation of an OFBGC. FIG. 4A is a top down view showing the example OFBGC design within a tube in the MCNP model of a reactor. FIG. 4B is a close up view of the example OFBGC geometry itself, showing the outer sheath 410, the argon 420, and the thermal mass 430. Air 440 surrounds the outer sheath 410.

Figure 5A:
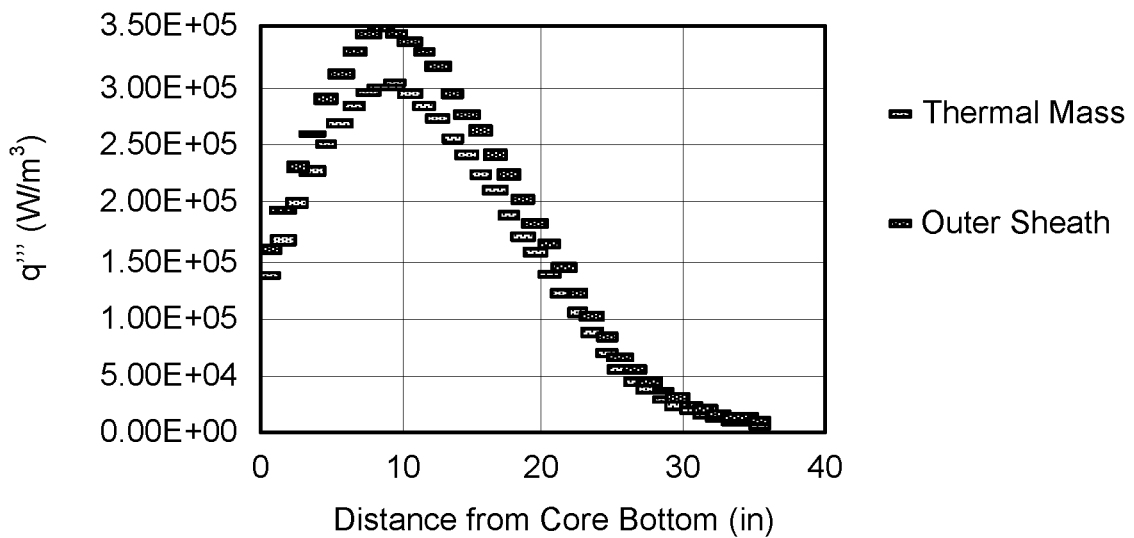
FIG. 5A is a chart that shows an energy deposition rate in the thermal mass and outer sheath of an implementation of an OFBGC.
Figure 5B:
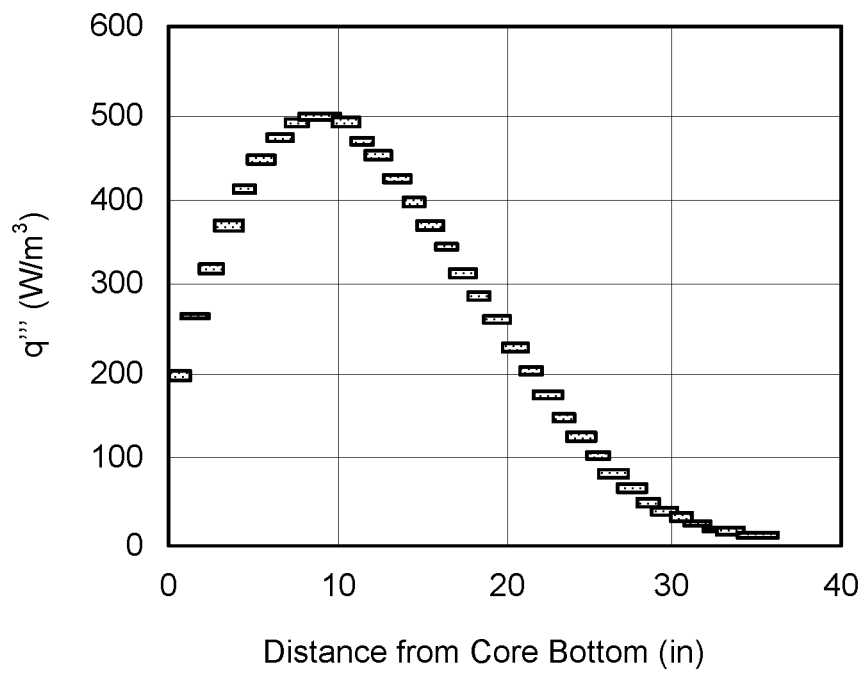
FIG. 5B is a chart that shows an energy deposition rate in the gas gap of the OFBGC used in FIG. 5A.

The heat generation rate as a function of axial position was determined for the three regions of the example OFBGC design. This was done by running three separate MCNP calculations, in which the region in question was divided into 1 inch long lengths along the 36 inches of the OFBGC. By using the F6 tally, the energy deposition rate per gram per source particle was determined for each of these segments, for each material in question. The total number of source particles for the reactor operating at 450 kW is $3.78 \times 10^{16}$ s$^{-1}$. By knowing the number of source particles, q''' as a function of axial length was determined. The q''' for the 3 regions of the example OFBGC is shown in FIGS. 5A and 5B. FIG. 5A is a chart 500 that shows an energy deposition rate in the thermal mass and outer sheath of an implementation of an OFBGC, and FIG. 5B is a chart 550 that shows an energy deposition rate in the gas gap of the OFBGC used in FIG. 5A.

Regarding thermal performance, heat generation rate as a function of axial position was determined for the three regions of the example OFBGC, so now consider how that impacts the thermal performance of the OFBGC. Given the heat generation rate as a function of axial length, determine the temperature profile in the OFBGC, and ensure that the ΔT values are high enough for good resolution, but not so high that the sensor materials could be damaged.

Also consider the measurement error that will result from different thermal conditions during calibration of the OFBGC, and the testing of the OFBGC in the reactor. Recall that during calibration, the OFBGC will not experience an axial heat flux, because the nichrome heating wire will supply a known, constant heat generation rate in the axial direction. During experimentation, there will be an energy deposition distribution, as shown in FIGS. 5A and 5B, which will result in an axial spreading of heat energy, and the ΔT profile will be modulated, which was not taken into account during calibration. Ideally, the ΔT modulation is minimal, such that the ΔT versus q''' curve from the calibration is relatively accurate when applied to the experimental conditions in the OFBGC. Low thermal conductivity quartz was chosen as the thermal mass material because it will result in minimized spreading of thermal energy.

An analytical thermal model is described. In order to solve for the OFBGC temperature response analytically, solve the two dimensional heat equation for the three region geometry of the simple OFBGC design with the assumption that q''' varies as a sinusoid in the axial direction of the OFBGC. This general equation is described as:

$$\frac{1}{r}\frac{\partial}{\partial r}r\frac{\partial}{\partial r}T(r,z) + \frac{\partial^2}{\partial z^2}T(r,z) = \frac{-q_\gamma''' \sin(kz)}{\kappa} \quad (5)$$

where T(r,z) is the radially and axially dependent temperature, $q_\gamma'''$ is the heat generation rate amplitude due to gamma heating, k is the frequency of the sinusoid, and κ is the thermal conductivity of the medium in question. Due to differences in the thermal conductivity, equation (5) has a specific solution for each of the three regions. Equation (5) becomes a special case of Bessel's equation when it is assumed that T(r,z) is separable.

Figure 6:
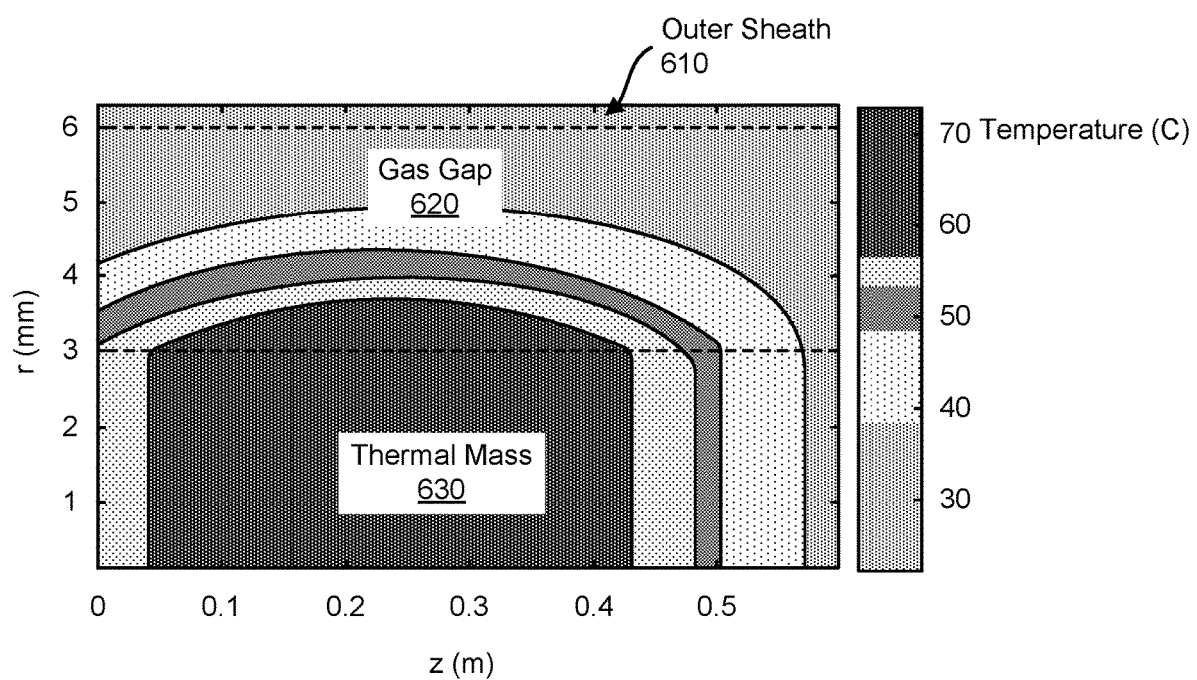
FIG. 6 illustrates the radially and axially dependent temperature $T(r,z)$ for an implementation of an OFBGC design based on a sinusoidal approximation of the axial distribution of the volumetric heat generation.

When approximating q''' as a sinusoid, a solution for T(r,z) for the simple OFBGC design is determined. The resultant T(r,z) is shown in FIG. 6. FIG. 6 illustrates T(r,z) for an implementation of an OFBGC design 600 based on the sinusoidal approximation of the axial distribution of the volumetric heat generation. The OFBGC design shows the regions of the outer sheath 610, the gas gap 620, and the thermal mass 630.

Determining T(r,z) is useful. And also consider the extent to which thermal energy spreads in the axial direction. Define a modulation transfer function (MTF) which is a ratio of output, ΔT, to input, q'''. This ratio is dependent on k. Note that during calibration, k=0. Thus, it is useful to normalize the MTF with respect to the calibration. Therefore, define a normalized transfer function, MTF', which is described as $$MTF' = \frac{MTF(k)}{MTF(0)} \quad (6)$$

Essentially, one can think of MTF' as the spreading of heat energy in the axial direction relative to the calibration. If MTF'(k) is close to unity, the measurement error will be small; if MTF'(k) is far from unity, the measurement error will be large, and the OFBGC will under-approximate the gamma dose rate. MTF'(k) for the OFBGC is shown in FIG.

Figure 7:
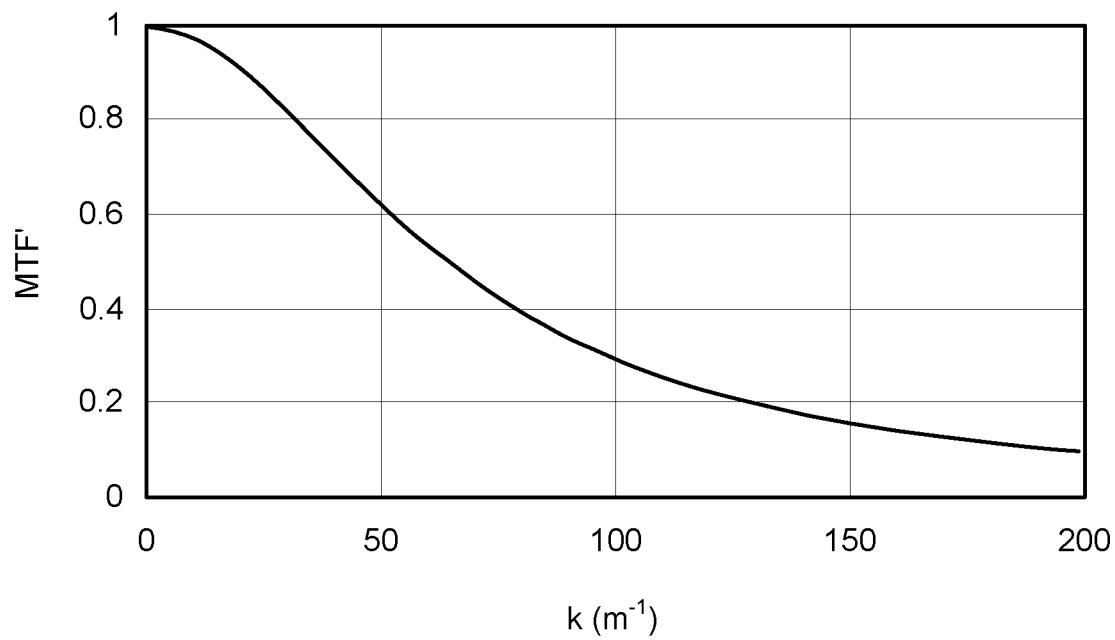
FIG. 7 is a chart for a modulation transfer function (MTF) for an implementation of an OFBGC design.

7. FIG. 7 is a chart 700 of MTF for an implementation of an OFBGC design over a range of k values. Note that k=4 m$^{-1}$ for the example reactor, so MTF' is nearly unity for application in the reactor. This means that the OFBGC will be sufficient for determination of the overall gamma dose rate profile in the reactor.

Figure 8:
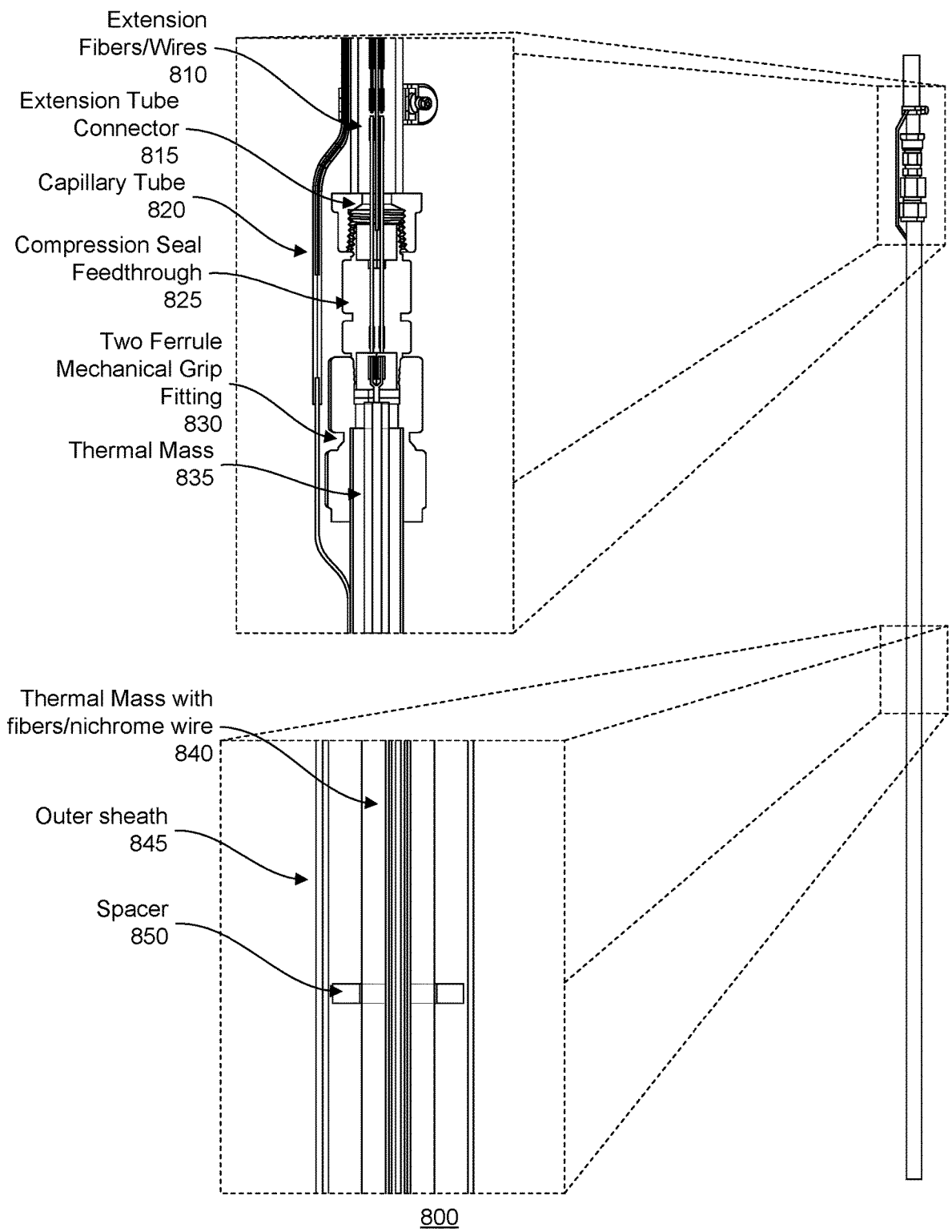
FIG. 8 is a diagram of an implementation of an OFBGC.

FIG. 8 is a diagram of an implementation of an OFBGC 800. As shown, the top portion of the OFBGC 800 comprises a stainless steel capillary tube 820, a two ferrule mechanical grip fitting 830, a compression seal feedthrough 825, and an extension tube connector 815. FIG. 8. shows that the stainless-steel capillary tube 820 transitions from a flexible, larger radius capillary, to a smaller rigid capillary which is bonded to the side of the OFBGC. The two-ferrule mechanical grip fitting 830 connects the compression seal feedthrough 825 to the OFBGC 800. The compression seal feedthrough 825 allows the extension fibers/wires to enter the OFBGC 800 while maintaining an inert gas environment within the OFBGC. The extension tube connector 815 connects the compression seal fitting to a flexible extension tube which consists of the extension fibers/wires 810. The extension fibers/wires, as well as the flexible section of the capillary tube 820, extend out of the reactor pool and connect the OFBGC 800 to an interrogation device outside of the reactor pool.

The thermal mass 835 with the fibers/nichrome wire are shown together as 835 in the internal portion of the OFBGC 800. Also shown in the internal portion of the OFBGC 800 is an aluminum outer sheath 845 and a spacer 850 (e.g., a glass spacer), similar to those described above with respect to various other embodiments and implementations. The fiber/nichrome wire 840 in the thermal mass connect to the extension fibers/wires 810 in a small gap between the thermal mass 835 and the compression seal feedthrough 825.

In some implementations, the thermal mass 835 comprises a quartz glass thermal mass due to low thermal conductivity. An insulating tube, such as a mullite insulating tube, may be used to hold fibers (e.g., having Type II-IR fiber Bragg gratings (FBGs)) and a nichrome heating wire for calibration. Fibers have Type II FBGs. Nichrome heating wire for calibration.

Thus, an OFBGC has been described in terms of its energy deposition rate and thermal response. The OFBGC shows promise for accurate determination of the gamma dose rate distribution in the reactor. The OFBGC reaches an appropriate steady-state temperature, and has little calibration error.

It is contemplated that the OFBGC described herein is applicable to many reactor types, for which the gamma-ray heating rates may be very different, depending on the particular implementation modifications of the OFBGC. These modifications may include the materials and the dimensions of the various parts. Regarding differences in gamma-ray heating rates, the gamma-ray absorbed dose rates would be significantly higher in the various parts of the OFBGC, if the OFBGC were used in a high power test in a high power reactor. One could compensate for a larger absorbed dose rate in the thermal mass, by reducing the radius of the thermal mass. Alternatively, or additionally, one could reduce the size of the gas gap, and/or the thermal conductivity of the gas within the gap, to achieve the same temperature difference with increased gamma heating rates in the thermal mass. One would want to optimize the choice of materials and dimensions of the OFBGC parts in a systematic fashion.

The OFBGC sensor array described herein does not require the metallic masses that are a part of the OFBGT of the '599 patent. Instead of using optical fibers to measure the temperatures within distinct metallic masses as in the '599 patent, in implementations of an OFBGC that are described herein, an optical fiber is used to measure the temperature of an annular cylindrical thermal mass with a low thermal conductivity, such as silica glass. The low thermal conductivity annular cylindrical thermal mass has the geometrical form of a small diameter circular cylindrical tube, that extends the total axial length of the OFBGC sensor array. There are no distinct thermal masses, as is the case with the OFBGT of the '599 patent. For the OFBGC, the hole within the thermal mass has a diameter that is slightly larger than the diameter of an optical fiber. An optical fiber runs the length of the tube and is used to measure the temperature of the thermal mass. The thermal mass is centered within a thin-walled metallic outer sheath. A gas gap fills the volume, between the thermal mass and outer sheath. The temperature of the outer sheath is measured with an optical fiber based temperature sensor that is attached to the outer surface of the sheath. The response of the OFBGC is the temperature difference, which is measured between the two optical fiber based temperature sensors (the one that is within the thermal mass and the one that is attached to the outside of the outer sheath). This response can be measured for any axial position within the OFBGC array; i.e., at any axial height.

An advantage of the OFBGC over the OFBGT of the '599 patent is that the number of sensors in the OFBGC sensor array is adjustable and limited only by the spatial resolution of the sensing technique, or the spatial resolution of the OFBGC sensors, within the OFBGC sensor array, based on thermal transport characteristics. Besides the advantage of having an adjustable segmentation for the sensor array, due to the axial uniformity of the thermal mass, another advantage of the OFBGC sensor array, in comparison to the OFBGT sensor array of the '599 patent, is that the OFBGC sensor design is simpler to build than the OFBGT sensor array.

As described further above, the spatial resolution of an array of OFBGC sensors can be defined in terms of the modulation transfer function for a sensor. For a power reactor, where the gamma-ray heating is large, the MTF for the sensor can be adjusted to balance achieving a sufficiently large temperature difference, between the two optical fiber based temperature sensors (the one within the thermal mass and the one that is attached to the outside of the thermal sheath), while simultaneously achieving a sufficiently good spatial resolution. A parameter in the design of an OFBGC that fulfills these two requirements is the choice of the material of which the thermal mass is formed. Metal is not an appropriate choice of the material from which the thermal mass is formed.

Appropriate materials for the thermal mass are thermal insulators, not metals (as it is stated in the design of an OFBGT of the '599 patent, with isolated and distinct thermal masses for each sensor in the OFBGT sensor array).

Additionally, conventional GTs use thermocouples to measure temperature and are located in guide tubes in BWRs that also contain LPRMs that the GTs are used to calibrate. Because an OFBGC described herein has such a small footprint, it could be back-fit into a BWR guide-tube, without disturbing the facilities condition. OFBGCs could be used in conjunction with conventional thermocouple-based GTs to provide better axial resolution of the reactor power profile. Moreover, OFBGCs could replace conventional thermocouple-based GTs in order to reduce the complexity of the LPRM calibration; since a pair of optical fibers can be used to measure temperatures in the thermal mass and in the outer sheath, at many axial locations in OFBGCs; whereas in comparison, the thermocouples that are used in conventional GTs measure temperature, at only one point, and require two wires per thermocouple. The improved axial resolution with OFBGCs, compared to conventional thermocouple-based GTs, may also provide a long term, permanent, and safe solution to improved monitoring of the spatial power distribution within nuclear reactor cores; thus leading to reduced design margin and improved plant efficiency and/or safety.

In summary, an OFBGC sensor array uses a thermal mass with a low thermal conductivity. Advantages of the OFBGC sensor array, in comparison to a conventional OFBGT, include: 1) the number of sensors in the OFBGC sensor array is adjustable and limited only by the spatial resolution of the OFBGC sensors, within the OFBGC sensor array, and 2) the OFBGC sensor design is simpler to build than the OFBGT sensor array. In addition to using OFBGCs to calibrate LPRMs, the OFBGC may be used to determine the power distribution in nuclear reactors, in some implementations.

It is noted that the term "calorimeter" is a more precise and recent term than the historically used term "thermometer" and is thus used in herein and in the claims, though the terms "calorimeter" and "thermometer" are interchangeable.

In an implementation, an optical fiber-based gamma calorimeter (OFBGC) comprises: a thermal mass; an insulating tube disposed within a central region of the thermal mass; a plurality of optical fiber sensors running through respective holes in the insulating tube, wherein the optical fiber sensors are configured to monitor a temperature of the thermal mass; and an outer sheath; with a gas backfilling between the thermal mass and the outer sheath.

Implementations may include some or all of the following features. The OFBGC further comprises a heating wire running through two holes in the insulating tube, wherein the heating wire is configured for calibration. The heating wire comprises nichrome. The OFBGC further comprises an additional optical fiber configured to monitor a temperature of the outer sheath. The additional fiber is disposed within a capillary tube connected to the other sheath. The thermal mass comprises at least one of quartz or mullite. The number of sensors is adjustable. The thermal mass is a low-thermal conductivity annular cylindrical mass, and wherein the insulating tube and the annular cylindrical thermal mass are one object. The thermal mass is annular in shape. The insulating tube is at least one of a thermocouple wire insulator or a 4-hole tube that is an electrical insulator. The gas backfilling is an inert gas.

In an implementation, an optical fiber-based gamma-ray calorimeter (OFBGC) sensor array comprises an optical fiber, wherein the optical fiber is used to measure the temperature of an annular cylindrical thermal mass with a low thermal conductivity.

Implementations may include some or all of the following features. The annular cylindrical thermal mass is quartz glass or the annular cylindrical thermal mass has the geometrical form of a low-thermal conductivity circular cylindrical tube that extends the total axial length of the OFBGC sensor array. A hole within the tube has a diameter that is larger than the diameter of an optical fiber. The optical fiber runs the length of the tube and is configured to measure the temperature of the thermal mass. The thermal mass is centered within a thin-walled metallic outer sheath, and a gas gap fills the volume between the thermal mass and an outer sheath. The temperature of the outer sheath is measured with an optical fiber-based temperature sensor that is attached to the outer surface of the outer sheath. A temperature difference is measured between an optical fiber-based temperature sensor that is within the thermal mass and the optical fiber-based temperature sensor that is attached to the outside of the outer sheath. The temperature difference can be measured for any axial position or any axial height within the OFBGC sensor array. The OFBGC sensor array further comprises an adjustable number of sensors, wherein the number of sensors is limited by the spatial resolution of the sensing technique, or the spatial resolution of the sensors, within the OFBGC sensor array, based on thermal transport characteristics.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An optical fiber-based gamma calorimeter (OFBGC) comprising:
    a thermal mass;
    an insulating tube disposed within a central region of the thermal mass;
    a plurality of optical fiber sensors running through respective holes in the insulating tube, wherein the optical fiber sensors are configured to monitor a temperature of the thermal mass;
    an outer sheath;
    a gas backfilling between the thermal mass and the outer sheath; and
    a heating wire running through two holes in the insulating tube,
    wherein the heating wire has a predetermined length and linear heating rate, $q'(z)$, and
    wherein the linear heating rate $q'(z)$, is used to derive a relationship with an axially dependent temperature difference, $\Delta T(z)$, between the plurality of optical fiber sensors to calibrate the OFBGC.

2. The OFBGC of claim 1, wherein the heating wire comprises nichrome.

3. The OFBGC of claim 1, further comprising an additional optical fiber configured to monitor a temperature of the outer sheath.

4. The OFBGC of claim 3, wherein the additional fiber is disposed within a capillary tube connected to the outer sheath.

5. The OFBGC of claim 1, wherein the thermal mass comprises at least one of quartz or mullite.

6. The OFBGC of claim 1, wherein the number of sensors is adjustable.

7. The OFBGC of claim 1, wherein the thermal mass is a low-thermal conductivity annular cylindrical mass, and wherein the insulating tube and the annular cylindrical thermal mass are an integrated structure.

8. The OFBGC of claim 1, wherein the thermal mass is annular in shape.

9. The OFBGC of claim 1, wherein the insulating tube is at least one of a thermocouple wire insulator or a 4-hole tube that is an electrical insulator.

10. The OFBGC of claim 1, wherein the gas backfilling is an inert gas.

11. An optical fiber-based gamma-ray calorimeter (OFBGC) sensor array comprising:
   an optical fiber,
   a heating wire,
   wherein the optical fiber is used to measure the temperature of an annular cylindrical thermal mass with a low thermal conductivity,
   wherein the heating wire has a predetermined length and linear heating rate, q'(z), and
   wherein the linear heating rate q'(z), is used to derive a relationship with an axially dependent temperature difference, $\Delta T(z)$, between the optical fiber and a second optical fiber-based temperature sensor to calibrate the OFBGC.

12. The OFBGC sensor array of claim 11, wherein the annular cylindrical thermal mass is quartz glass or the annular cylindrical thermal mass has the geometrical form of a low-thermal conductivity circular cylindrical tube that extends the total axial length of the OFBGC sensor array.

13. The OFBGC sensor array of claim 12, wherein a hole within the tube has a diameter that is larger than the diameter of an optical fiber.

14. The OFBGC sensor array of claim 12, wherein the optical fiber runs the length of the tube and is configured to measure the temperature of the thermal mass.

15. The OFBGC sensor array of claim 11, wherein the thermal mass is centered within a thin-walled metallic outer sheath, and a gas gap fills the volume between the thermal mass and an outer sheath.

16. The OFBGC sensory array of claim 15, wherein the temperature of the outer sheath is measured with the second optical fiber-based temperature sensor that is attached to the outer surface of the outer sheath.

17. The OFBGC sensory array of claim 16, wherein a temperature difference is measured between the second optical fiber-based temperature sensor that is within the thermal mass and the optical fiber-based temperature sensor that is attached to the outside of the outer sheath.

18. The OFBGC sensor array of claim 17, wherein the temperature difference is measured for any axial position or any axial height within the OFBGC sensor array.

19. The OFBGC sensor array of claim 11, further comprising an adjustable number of sensors, wherein the number of sensors is limited by the spatial resolution of the sensing technique, or the spatial resolution of the sensors, within the OFBGC sensor array, based on thermal transport characteristics.

* * * * *

UNITED STATES PATENT AND TRADEMARK OFFICE
CERTIFICATE OF CORRECTION

PATENT NO. : 12,247,937 B2
APPLICATION NO. : 17/213432
DATED : March 11, 2025
INVENTOR(S) : Thomas E. Blue, Anthony Birri and Christian M. Petrie Page 1 of 1

It is certified that error appears in the above-identified patent and that said Letters Patent is hereby corrected as shown below:

In the Claims

Column 14, Line 16 In Claim 16, after "OFBGC" delete "sensory" and insert -- sensor --

Column 14, Line 20 In Claim 17, after "OFBGC" delete "sensory" and insert -- sensor --

Signed and Sealed this
Seventeenth Day of June, 2025

Coke Morgan Stewart
*Acting Director of the United States Patent and Trademark Office*